United States Patent
Kang et al.

(10) Patent No.: US 7,161,378 B2
(45) Date of Patent: Jan. 9, 2007

(54) SEMICONDUCTOR MEMORY DEVICE WITH ON DIE TERMINATION CIRCUIT

(75) Inventors: Hee-Bok Kang, Kyoungki-do (KR); Jin-Hong Ahn, Kyoungki-do (KR)

(73) Assignee: Hynix Semiconductor, Inc. (KR)

( * ) Notice: Subject to any disclaimer, the term of this patent is extended or adjusted under 35 U.S.C. 154(b) by 111 days.

(21) Appl. No.: 11/030,558

(22) Filed: Jan. 5, 2005

(65) Prior Publication Data

US 2006/0091900 A1 May 4, 2006

(30) Foreign Application Priority Data

Oct. 30, 2004 (KR) ............... 10-2004-0087725

(51) Int. Cl.
*H03K 17/16* (2006.01)
(52) U.S. Cl. .......................... 326/30; 326/26
(58) Field of Classification Search .............. 326/26, 326/27, 30, 82, 83–87
See application file for complete search history.

(56) References Cited

U.S. PATENT DOCUMENTS

| | | | |
|---|---|---|---|
| 6,411,122 B1 | 6/2002 | Mughal et al. | |
| 6,414,512 B1 | 7/2002 | Moyer | |
| 6,424,170 B1 * | 7/2002 | Raman et al. | ........... 326/30 |
| 6,560,290 B1 | 5/2003 | Ahn et al. | |
| 6,754,129 B1 * | 6/2004 | Khatri et al. | ........... 365/226 |
| 6,885,959 B1 * | 4/2005 | Salmon et al. | ........... 702/107 |
| 6,894,946 B1 * | 5/2005 | Jang | ........... 365/233 |
| 6,980,020 B1 * | 12/2005 | Best et al. | ........... 326/30 |
| 7,034,565 B1 * | 4/2006 | Lee | ........... 326/30 |
| 2003/0016512 A1 | 1/2003 | McCall et al. | |
| 2003/0223303 A1 | 12/2003 | Lamb et al. | |
| 2004/0066683 A1 | 4/2004 | Hartmann et al. | |
| 2004/0189343 A1 | 9/2004 | Jang | |
| 2004/0218434 A1 | 11/2004 | Hwang et al. | |
| 2004/0240298 A1 | 12/2004 | Jin | |
| 2005/0264316 A1 * | 12/2005 | Atkinson | ........... 326/30 |

FOREIGN PATENT DOCUMENTS

KR    1020040043995 A    5/2004

OTHER PUBLICATIONS

Korean Office Action with English translation for KR Patent Application No. 2004-87725, Apr. 17, 2006.

* cited by examiner

*Primary Examiner*—Don Le
(74) *Attorney, Agent, or Firm*—Blakely Sokoloff Taylor & Zafman

(57) ABSTRACT

A semiconductor memory device having a data input/output pad connected to a data input node includes: an on die termination resistor one end of which is connected to the data input node; and a switch one end of which is connected to the other end of the on die termination resistor for connecting/disconnecting the on die termination resistor with an on die termination voltage.

8 Claims, 8 Drawing Sheets

US 7,161,378 B2

SEMICONDUCTOR MEMORY DEVICE WITH ON DIE TERMINATION CIRCUIT

FIELD OF INVENTION

The present invention relates to a semiconductor memory device; and, more particularly, to a semiconductor memory device including an on die termination circuit.

DESCRIPTION OF PRIOR ART

Generally, a chipset is employed for controlling data flow between a semiconductor memory device and a micro processor in an electronic system.

When the chipset transfers a data signal to the semiconductor memory device, the data signal outputted from an output buffer of the chipset is inputted to an input buffer of the semiconductor memory device. At this time, because of an impedance mismatching between an impedance of the input buffer of the semiconductor memory device and an impedance of a data transferring line, the data signal inputted to the input buffer is partially reflected to the data transferring line.

At a low data transferring speed, the signal reflection is tolerable, i.e., the data transferring operations is stably performed. However, at a high data transferring speed, the signal reflection prevents the data transferring operation from being stably operated. That is, since a reflected signal of a previous data interferes with a next data outputted from the output buffer of the chipset, the semiconductor memory device cannot stably receive a data.

For preventing the above-mentioned problem, a termination circuit is provided with the semiconductor memory device for matching the impedance of the input buffer and the impedance of the data transferring line.

The termination circuit is generally formed with a termination resistor and a switch. The impedance matching is performed by connecting the termination resistor to the input buffer with the switch while the data signal is inputted to the semiconductor memory device.

FIG. 1 is a block diagram showing a block diagram showing a conventional termination circuit.

As shown, a conventional termination circuit 30 is connected between an output buffer 11 of a chipset 10 and an input buffer 21 of a semiconductor memory device 30 for receiving a data signal Da.

The termination circuit 30 includes a first resistor Ra connected between a power supply voltage VDD and a data transferring line 40; and a second resistor Rb connected between the data transferring line 40 and a ground voltage VSS.

If it is assumed that an impedance of the data transferring line 40 is 28 ohm, each resistance of the first and the second resistors Ra and Rb is 56 ohm so that an impedance of the input buffer 21 can be 28 ohm for the impedance matching.

If the impedance of the transferring line 40 and the impedance of the input buffer 21 are matched as above-mentioned, a reflected signal Dr is eliminated since the reflected signal Dr is flown to the first and the second resistors Ra and Rb. Therefore, the above-mentioned interference between the reflected data signal and the outputted data signal of the output buffer is prevented.

As a semiconductor memory device is highly integrated and an operational speed of the semiconductor memory device is increased, an on die termination (ODT) circuit has been developed for including a termination circuit into the semiconductor memory device.

FIG. 2 is a schematic circuit diagram showing a conventional on die termination circuit.

As shown, a conventional on die termination circuit 50 is coupled to an output buffer 60 and an input buffer 70. The output buffer 60 and the input buffer 70 are connected to a memory core for receiving a data output signal Dout and for inputting a data input signal Din from/to the memory core respectively. Also, the conventional on die termination circuit 50 is connected to a data input/output pad (DQ pad). Herein, the conventional on die termination circuit 50, the output buffer 60, the input buffer 70 and the DQ pad are commonly connected to a common node X.

The output buffer 60 outputs the data output signal Dout outputted from the memory core to an external circuit through the DQ pad, and the input buffer 70 receives the data input signal Din inputted through the DQ pad and inputs the data input signal Din to the memory core.

The on die termination circuit 50 includes a first to a fourth resistors R1 to R4, a p-type metal oxide semiconductor (PMOS) transistor MP1, an n-type metal oxide semiconductor memory device MN1 and an inverter I1.

The first PMOS transistor MP1 is connected between the power supply voltage VDD and the first resistor R1 and receives an on die termination signal ODT_sig through a gate of the first PMOS transistor MP1. The inverter I1 inverts the on die termination signal ODT_sig and inputs the inverted on die termination signal to a gate of the NMOS transistor MN1. The NMOS transistor is connected between the fourth resistor R4 and the ground voltage VSS. The first and the second resistors R1 and R2 are connected in series between the PMOS transistor MP1 and the common node X. Similarly, the third and the fourth resistors are connected in series between the common node X and the NMOS transistor MN1.

Generally, the semiconductor memory device uses the DQ pad not only for outputting data but also for inputting data in order to reduce the number of DQ pads.

Therefore, the on die termination circuit 50 is disabled when the DQ pad is used as a data output pad and is enabled when the DQ pad is used as a data input pad.

When the on die termination signal ODT_sig is activated as a logic low level, the PMOS transistor MP1 and the NMOS transistor MN1 are turned on, whereby a voltage level of the common node X is half of a voltage level of the power supply voltage VDD.

As above-mentioned, if an impedance of a data transferring line is 28 ohm, a resistance of the first and the second resistors R1 and R2 is 56 ohm and a resistance of the third and the fourth resistors R3 and R4 is also 56 ohm.

Therefore, when the PMOS transistor MP1 and the NMOS transistor MN1 are turned on, an impedance of the common node X is 28 ohm and is matched to the impedance of the data transferring line.

FIG. 3 is a schematic circuit diagram simply depicting the conventional on die termination circuit 50 shown in FIG. 2.

A first termination resistor RTT1 stands for the first and the second resistors R1 and R2, and a second termination resistor RTT2 stands for the third and the fourth resistors R3 and R4. A first switch SW1 stands for the PMOS transistor MP1 and a second switch SW2 stands for the NMOS transistor MN1. Generally a variable resistor is used as the first and the second termination resistor RTT1 and RTT2 for controlling each resistance of the first and the second termination resistor RTT1 and RTT2.

As shown, the first and the second termination resistor RTT1 and RTT2 are connected to the DQ pad when the first and the second switches SW1 and SW2 are closed and are disconnected from the DQ pad when the first and the second switches SW1 and SW2 are opened.

Therefore, while data are inputted to the semiconductor memory device, power consumption is increased due to the first and the second termination resistors RTT1 and RTT2 since a direct current is continuously flown through the first and the second termination resistors RTT1 and RTT2.

FIG. 4 is a diagram showing power consumption according to a data swing voltage.

As shown, as the data swing voltage is increased, the power consumption is increased.

The data swing voltage is decreased as a performance of the semiconductor memory device is improved. Accordingly, the power consumption for transferring data is decreased. However, while inputting data to the semiconductor memory device, it is difficult to reduce the power consumption due to the termination resistors.

SUMMARY OF INVENTION

It is, therefore, an object of the present invention to provide a semiconductor memory device capable of reducing power consumption for performing an on die termination operatioin.

In accordance with an aspect of the present invention, there is provided a semiconductor memory device having a data input/output pad connected to a data input node including: an on die termination resistor one end of which is connected to the data input node; and a switch one end of which is connected to the other end of the on die termination resistor for connecting/disconnecting the on die termination resistor with an on die termination voltage.

In accordance with another aspect of the present invention, there is provided a semiconductor memory device for controlling on die termination operation, including: a first data input/output pad connected to a first data input node; a second data input/output pad connected to a second data input node; a first on die termination resistor one end of which is connected to the first data input node; a second on die termination resistor one end of which is connected to the second data input node; a first switch one end of which is connected to the other end of the first on die termination resistor for connecting/disconnecting an on die termination voltage with the first on die termination resistor; and a second switch one end of which is connected to the other end of the second on die termination resistor for connecting/disconnecting the on die termination voltage with the second on die termination resistor.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF INVENTION

Hereinafter, a semiconductor memory device in accordance with the present invention will be described in detail referring to the accompanying drawings.

Figure 1:
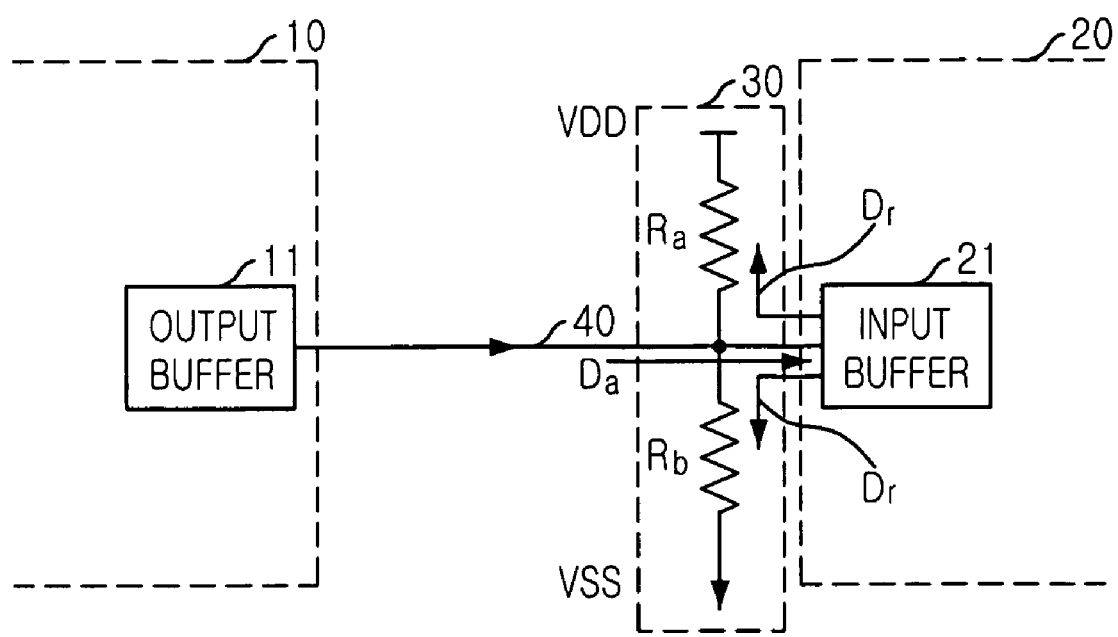
FIG. 1 is a block diagram showing a block diagram showing a conventional termination circuit.
Figure 2:
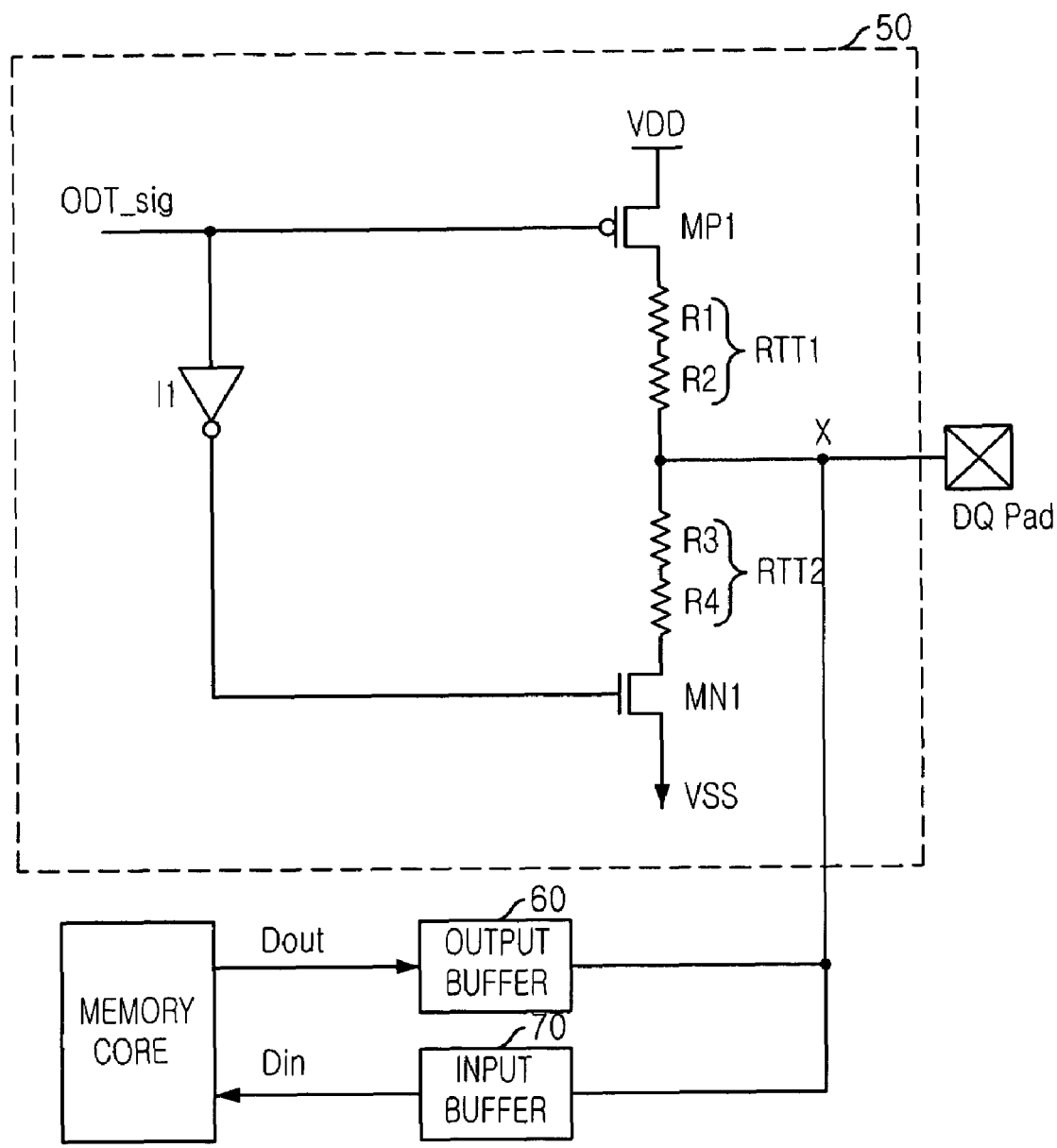
FIG. 2 is a schematic circuit diagram showing a conventional on die termination circuit.
Figure 3:
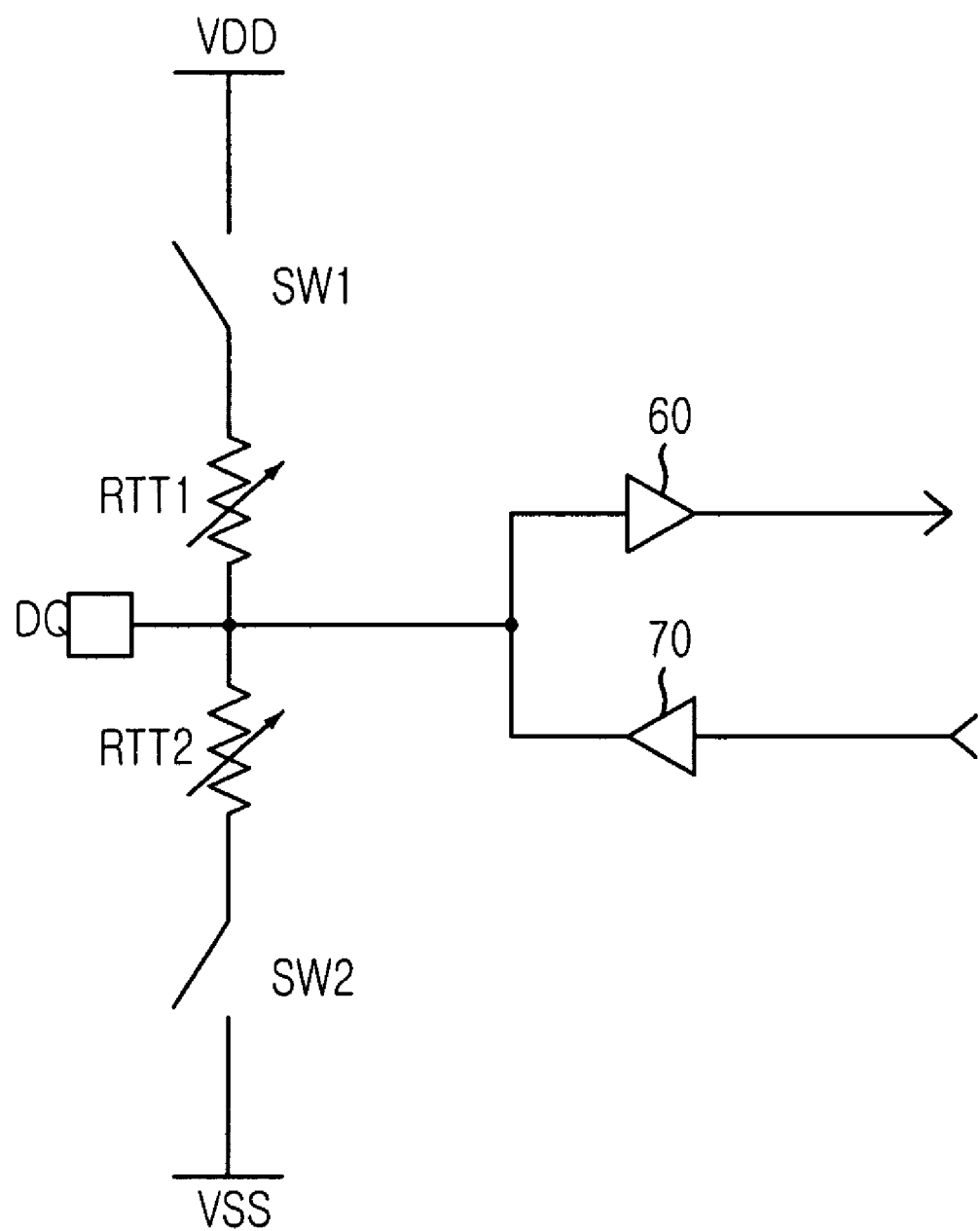
FIG. 3 is a schematic circuit diagram simply depicting the conventional on die termination circuit shown in FIG. 2.
Figure 4:
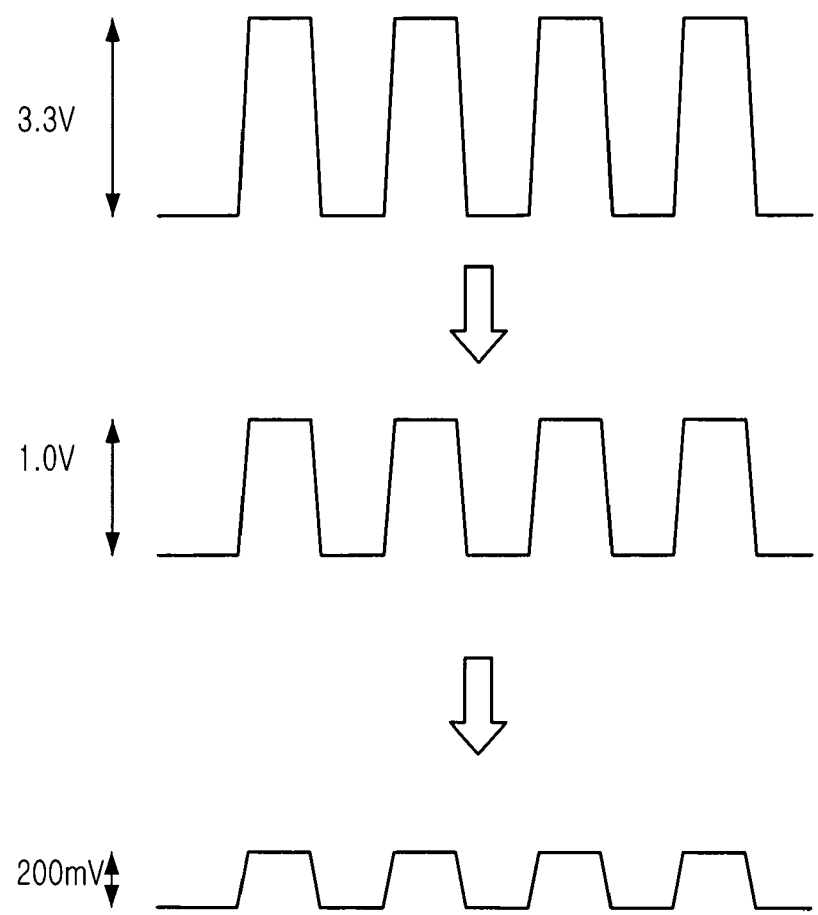
FIG. 4 is a diagram showing power consumption according to a data swing voltage.
Figure 4:
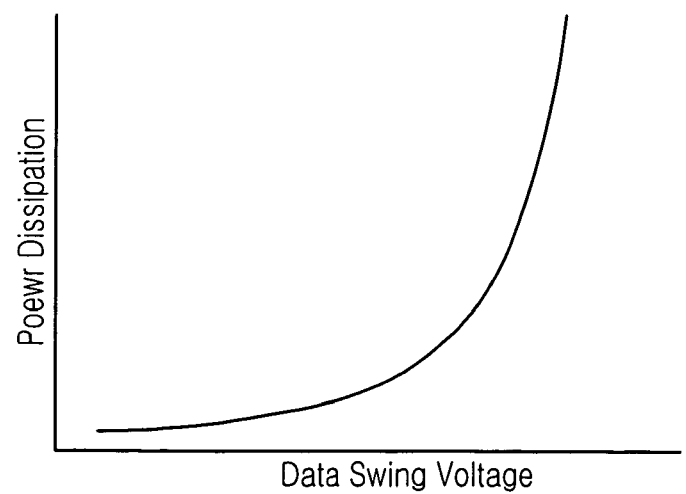
Figure 5:
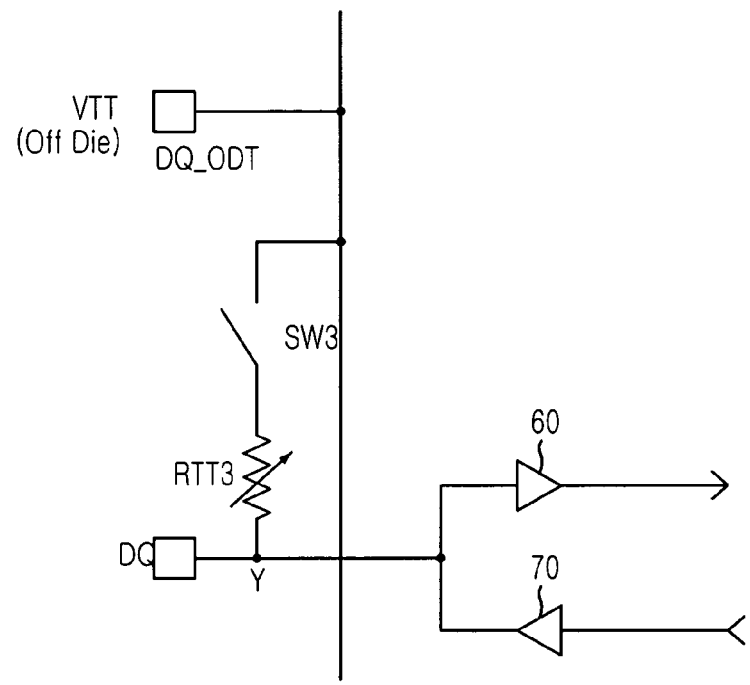
FIG. 5 is a schematic circuit diagram showing an on die termination circuit for in accordance with a first embodiment of the present invention.

FIG. 5 is a schematic circuit diagram showing an on die termination circuit for use in a semiconductor memory device in accordance with a first embodiment of the present invention.

As shown, the on die termination circuit includes a data input/output pad (DQ pad) for inputting/outputting data; a data input buffer 60 for buffering an output data outputted from the DQ pad; an on die termination pad DQ_ODT for receiving an on die termination voltage VTT from an external circuit; an on die termination resistor RTT3 connected between the on die termination pad DQ_ODT and the DQ pad; and a switch SW3 for connecting the on die termination resistor RTT3 to the on die termination pad DQ_ODT. The DQ pad is connected to the data input buffer 60 and a data output buffer 70.

Herein, the switch SW3 can be formed by a metal oxide semiconductor (MOS) transistor. The termination resistor RTT3 is a variable resistor capable of changing a resistance. When the switch SW3 is turned on, the on die termination voltage VTT is supplied to a data input terminal Y through the on die termination resistor RTT3. Herein, as above-mentioned, the on die termination voltage VTT is supplied by the external circuit, i.e., a board on an electronic system.

According to the conventional on die termination circuit, the termination voltage is supplied by flowing a direct current through a resistor connected between the power supply voltage and the data input terminal and a resistor connected between the data input terminal and the ground voltage. Therefore, due to the direct current generated during inputting data, a power consumption is increased. However, in accordance with the first embodiment of the present invention, the power consumption can be reduced by connecting the on die termination resistor RTT3 to the data input buffer Y and by receiving the on die termination voltage VTT from the external circuit.

As above-mentioned, the termination operation for the impedance matching is required for a high speed data transferring operation. If the power consumption is increased due to the termination operation, it is hampered to develop a low-power semiconductor memory device.

Therefore, the present invention can be employed for a high-speed and low-power semiconductor memory device.

Figure 6:
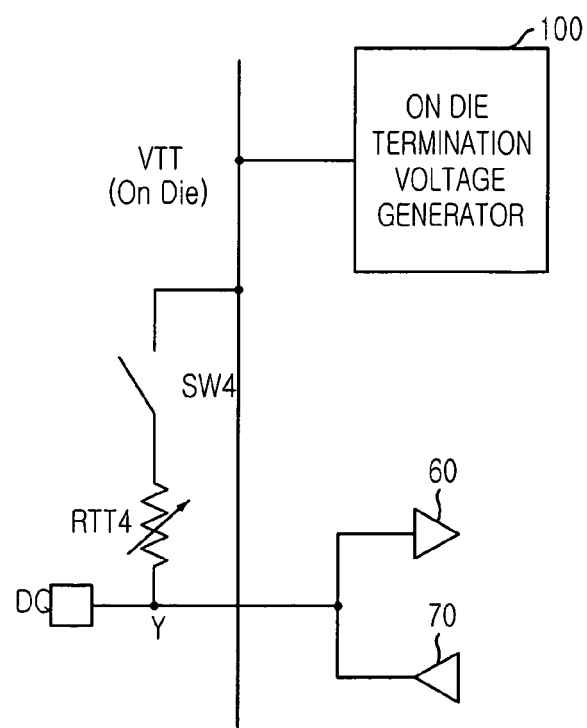
FIG. 6 is a schematic circuit diagram showing an on die termination circuit in accordance with a second embodiment of the present invention.

FIG. 6 is a schematic circuit diagram showing an on die termination circuit in accordance with a second embodiment of the present invention.

As shown, the on die termination circuit includes a data input/output pad (DQ pad) for inputting/outputting data; a data input buffer 60 for buffering an output data outputted from the DQ pad; an on die termination voltage generator 100 for generating an on die termination voltage VTT; an on die termination resistor RTT4 one end of which is connected to the DQ pad; and a switch SW4 for connecting the on die termination voltage VTT to the on die termination resistor RTT4 while data are inputted to the data input buffer 60. The DQ pad is connected to the data input buffer 60 and a data output buffer 70.

Herein, a voltage level of the termination voltage VTT is adjusted so that a voltage level of at an input node Y can be half of a voltage level of a power supply voltage VDD. The on die termination resistor RTT4 is a variable resistor capable of changing a resistance.

As shown in FIG. 6, the switch SW4 and the termination resistor RTT4 are connected in series to be coupled to the data input node Y, and the termination voltage VTT is generated in the semiconductor memory device to be supplied to the input node Y through the termination resistor RTT4.

Therefore, as above-mentioned, such the direct current generated by the conventional on die termination circuit is not generated. Accordingly, the power consumption can be reduced.

In addition, since the on die termination voltage VTT is generated by a separate on die termination voltage generator, i.e., the on die termination voltage generator 100, an optimum on die termination voltage can be supplied to the input node Y.

Figure 7:
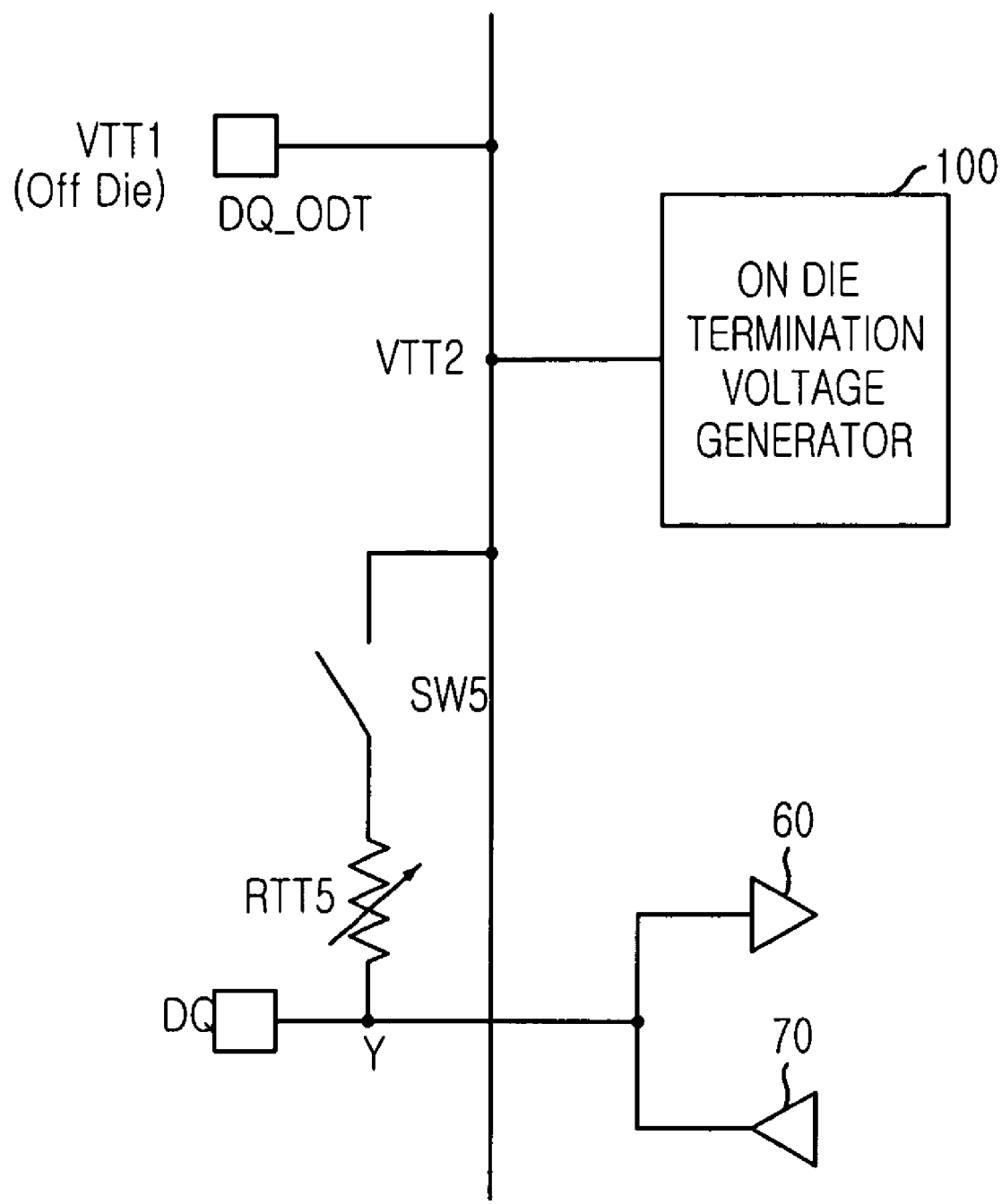
FIG. 7 is a schematic circuit diagram depicting an on die termination circuit in accordance with a third embodiment of the present invention.

FIG. 7 is a schematic circuit diagram depicting an on die termination circuit in accordance with a third embodiment of the present invention.

As shown, the on die termination circuit includes a data input/output pad (DQ pad); a data input buffer 60 for buffering an output data outputted from the DQ pad; an on die termination pad DQ_ODT for receiving a first on die termination voltage VTT1 from an external circuit; an on die termination voltage generator 100 for generating a second on die termination voltage VTT; an on die termination resistor RTT5 one end of which is connected to the DQ pad; and a switch SW5 for connecting the first on die termination voltage VTT1 or the second on die termination voltage VTT2 to the on die termination resistor RTT5 while data are inputted to the data input buffer 60. The DQ pad is connected to the data input buffer 60 and a data output buffer 70.

Herein, the termination resistor RTT5 is a variable resistor capable of changing a resistance.

Meanwhile, as above-mentioned, two on die termination voltages, i.e., the first and the second on die termination voltages VTT1 and VTT2, are generated, and one of them is supplied to a data input node Y.

Figure 8:
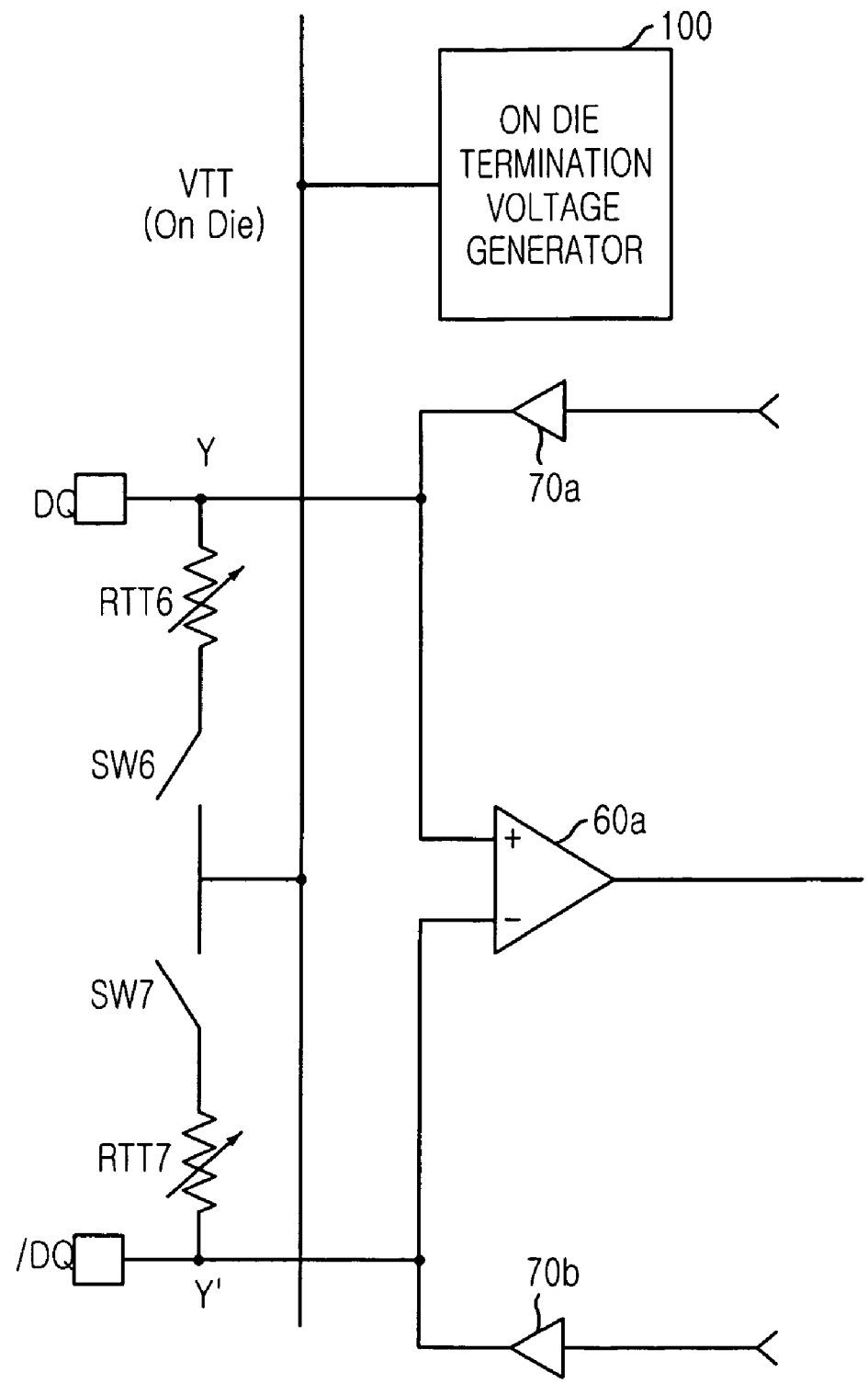
FIG. 8 is a schematic circuit diagram showing an on die termination circuit in accordance with a fourth embodiment of the present invention.

FIG. 8 is a schematic circuit diagram showing an on die termination circuit in accordance with a fourth embodiment of the present invention.

As shown, the on die termination circuit includes a first data input/output pad (DQ pad) for transferring data signal; a second data input/output pad (/DQ pad) for transferring inverted data signal; an on die termination voltage generator 100 for generating an on die termination voltage VTT; a first on die termination resistor RTT6 one end of which is coupled to the DQ pad; a second on die termination resistor RTT7 one end of which is coupled to the /DQ pad; a first switch SW6 for connecting the first on die termination resistor RTT6 to the on die termination voltage VTT while data are inputted to the DQ pad; a second switch SW7 for connecting the second on die termination resistor RTT7 to the on die termination voltage VTT while data are inputted to the /DQ pad; and a data input comparison unit 60a for comparing an output of the DQ and an output of the /DQ pad to transfer the comparison result to a memory core.

Herein, the first and the second on die termination resistors RTT6 and RTT7 are variable resistors capable of changing a resistance.

As an operational speed of a semiconductor memory device is increased, a data is inputted or outputted with an inverted version of the data at the same time. In this case, more data input/output pads and buffers are required. However, a data transferring operation can be performed with a higher speed by using a signal difference between the data pair, i.e., the data and the inverted data.

The on die termination circuit shown in FIG. 8 can be employed for a semiconductor memory device which performs the above-mentioned data transferring operation, i.e., transfers data in pairs. Since the structure and the operation of the on die termination circuit in accordance with the fourth embodiment are similar to those of the first to the third embodiments, the power consumption can be reduced by using the on die termination circuit shown in FIG. 8.

Figure 9:
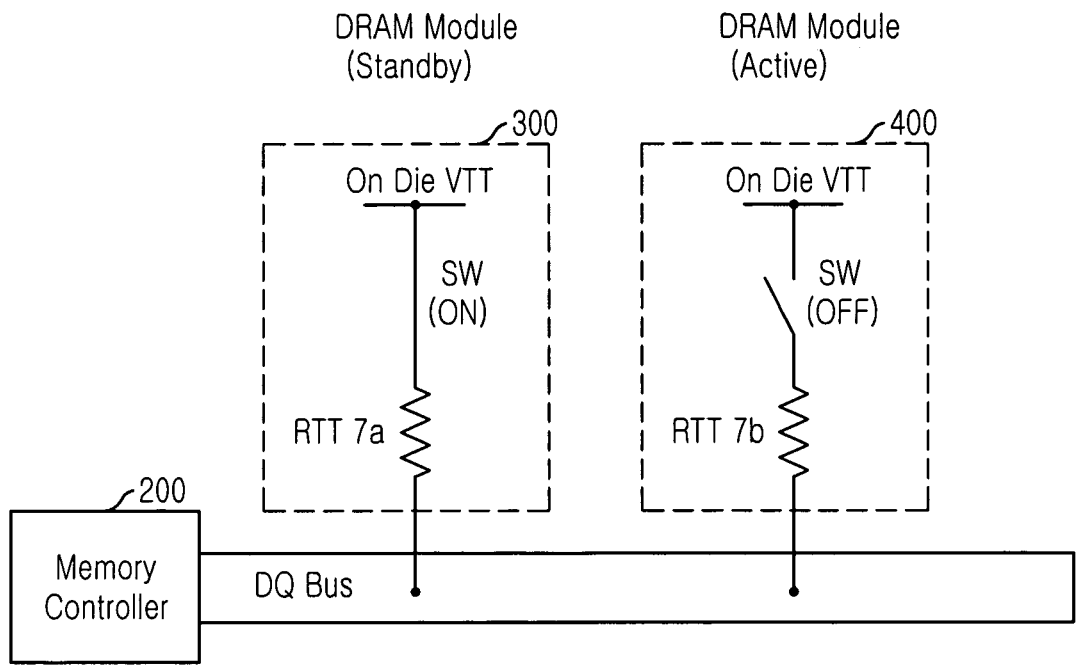
FIGS. 9 and 10 are block diagrams for showing exemplary applications of the on die termination circuit in accordance with the present invention.
Figure 10:
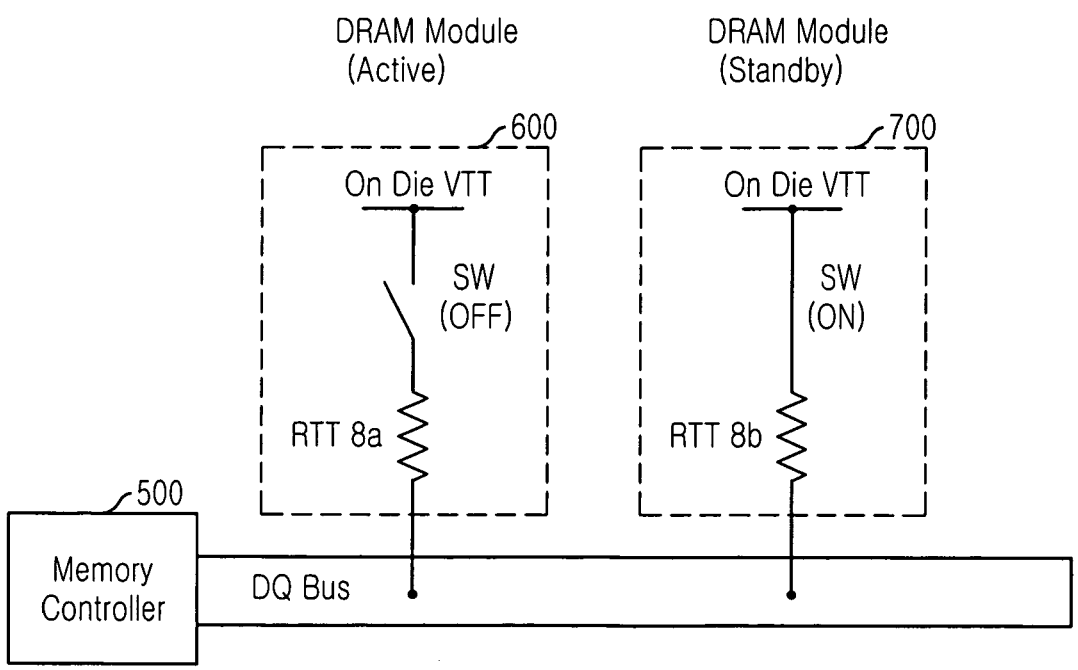

FIGS. 9 and 10 are block diagrams for showing exemplary applications of the on die termination circuit in accordance with the present invention.

Generally, a plurality of memory modules, i.e., 300 and 400, are connected to a memory controller 200 through a board bus (DQ bus). When the memory module 300 is in a standby mode, an on die termination circuit included in the memory module 300 is activated by supplying an on die termination voltage VTT to the DQ bus. Meanwhile, since the on die termination voltage VTT may cause a noise of a data input node during inputting data, an on die termination circuit included in the memory module 400 which is in an active mode is inactivated. However, since the memory module 300 does not perform a data transferring operation, a noise of the data input node is not generated.

Since each data input node of memory modules are commonly connected to the DQ bus in parallel, the termination operation to a data input node of a memory module can be performed by using an on die termination circuit of a neighboring memory module.

Therefore, in accordance with the present invention, an on die termination voltage can be supplied to a data input consuming less power. Accordingly, a power consumption of a semiconductor memory device can be reduced.

The present application contains subject matter related to Korean patent application No. 2004-87725, filed in the Korean Patent Office on Oct. 30, 2004, the entire contents of which being incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. A semiconductor memory device having a data input/output pad connected to a data input node, comprising:
   an on die termination resistor, one end of which is connected to the data input node;
   a switch, one end of which is connected to the other end of the on die termination resistor;
   an on die termination pad coupled to the other end of the switch for receiving a first on die termination voltage from an external circuit; and
   an on die termination voltage generator coupled to the other end of the switch for generating a second on die termination voltage, wherein the switch supplies one of the first on die termination voltage and the second on die termination voltage as the on die termination voltage to the data input node.

2. The semiconductor memory device as recited in claim 1, wherein the switch connects the on die termination resistor to the on die termination voltage while data are inputted to the semiconductor memory device through the data input/output pad.

3. The semiconductor memory device as recited in claim 1, wherein the on die termination resistor is a variable resistor capable of changing a resistance.

4. The semiconductor memory device as recited in claim 3, further comprising:
- a data input buffer for receiving the data outputted from the data input/output pad in order to input the data into the semiconductor memory device; and
- a data output buffer for receiving data outputted from a memory core of the semiconductor memory device to thereby output the received data through the data input/output pad.

5. A semiconductor memory device for controlling on die termination operation, comprising:
- a first data input/output pad connected to a first data input node;
- a second data input/output pad connected to a second data input node;
- a first on die termination resistors one end of which is connected to the first data input node;
- a second on die termination resistors one end of which is connected to the second data input node;
- a first switch, one end of which is connected to the other end of the first on die termination resistor;
- a second switch, one end of which is connected to the other end of the second on die termination resistor;
- an on die termination pad coupled to the other ends of the first and the second switches for receiving a first on die termination voltage from an external circuit; and
- an on die termination voltage generator coupled to the other ends of the first switch and the second switches for generating a second on die termination voltage,
- wherein the first and the second switches supply one of the first on die termination voltage and the second on die termination voltage as an on die termination voltage to the first and the second data input nodes.

6. The semiconductor memory device as recited in claim 5, wherein the first switch connects the first on die termination resistor to the on die termination voltage while data are inputted to the semiconductor memory device through the first data input/output pad.

7. The semiconductor memory device as recited in claim 6, wherein each of the first on die termination resistor and the second on die termination resistor is a variable resistor capable of changing a resistance.

8. The semiconductor memory device as recited in claim 7, further comprising:
- a data input unit for comparing outputs of the first and the second data input/output pads to output a comparison result to a memory core of the semiconductor memory device;
- a first data output buffer for receiving data output from the memory core to thereby output the data through the first data input/output pad; and
- a second data output buffer for receiving the data to thereby output the data through the second data input/output pad.

* * * * *

UNITED STATES PATENT AND TRADEMARK OFFICE
CERTIFICATE OF CORRECTION

PATENT NO. : 7,161,378 B2 Page 1 of 1
APPLICATION NO. : 11/030558
DATED : January 9, 2007
INVENTOR(S) : Kang et al.

It is certified that error appears in the above-identified patent and that said Letters Patent is hereby corrected as shown below:

In claim 5, column 7, line 28, please delete "resistors" and insert -- resistor, --.

In claim 5, column 7, line 30, please delete "resistors" and insert -- resistor, --.

Signed and Sealed this

Seventh Day of August, 2007

JON W. DUDAS
*Director of the United States Patent and Trademark Office*